United States Patent
Wu et al.

(10) Patent No.: US 7,697,465 B2
(45) Date of Patent: Apr. 13, 2010

(54) METHOD, SYSTEM AND APPARATUS FOR RECEIVING MULTICAST AND BROADCAST SERVICE

(75) Inventors: Jianjun Wu, Shenzhen (CN); Zhengfei Xiao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 341 days.

(21) Appl. No.: 11/746,701

(22) Filed: May 10, 2007

(65) Prior Publication Data
US 2007/0268933 A1 Nov. 22, 2007

Related U.S. Application Data

(63) Continuation of application No. PCT/CN2005/001929, filed on Nov. 16, 2005.

(30) Foreign Application Priority Data
Nov. 16, 2004 (CN) .................... 2004 1 0094838

(51) Int. Cl.
*H04H 60/41* (2008.01)
*H04H 20/57* (2008.01)
(52) U.S. Cl. .................. 370/312; 370/329; 370/343; 370/345; 370/432; 370/468
(58) Field of Classification Search ............ 370/290, 370/292
See application file for complete search history.

(56) References Cited

U.S. PATENT DOCUMENTS

2004/0185852 A1 9/2004 Son et al.
2004/0229605 A1 11/2004 Hwang et al.
2005/0120097 A1* 6/2005 Walton et al. ............... 709/220

FOREIGN PATENT DOCUMENTS

| CN | 1522018 | 8/2004 |
|---|---|---|
| EP | 1804526 | 7/2007 |
| KR | 2003-0046006 A | 6/2003 |

OTHER PUBLICATIONS

Duke Dang, "The Enhancement to Macro Diversity in MBS Service", IEEE C802.16e-04/450) (XP-002457650), Nov. 4, 2004.*

(Continued)

*Primary Examiner*—Huy D Vu
*Assistant Examiner*—Maria L Sekul
(74) *Attorney, Agent, or Firm*—Finnegan, Henderson, Farbow, Garrett & Dunner LLP

(57) ABSTRACT

Embodiments of the present invention provide a method for receiving Multicast and Broadcast Service (MBS), include: adding information of a next MBS_MAP message in a current MBS_MAP message; determining receiving information of the next MBS_MAP message according to the current MBS_MAP message and the information added in the current MBS_MAP message, receiving the next MBS_MAP message according to the receiving information determined, and receiving the MBS service according to the next MBS_MAP message received. The embodiments of the present invention also provide two other methods, apparatus and a system for receiving the MBS service. The method, system and apparatus provided by the embodiments of the present invention implement the continuous receiving of the MBS service without the requirement of frequent receiving the DL_MAP message.

26 Claims, 1 Drawing Sheet

OTHER PUBLICATIONS

Samsung Electronics, "MBS Clarification", IEEE C802.16e-04/442r1, (XP-002459209), Nov. 4, 2004.*

IEEE P802.16e/D8, "Part 16: Air Interface for Fixed and Mobile Broadband Wireless Access Systems Amendment for Physical and Medium Access Control Layers for Combined Fixed and Mobile Operation in Licensed Bands", pp. 135-142, May 20, 2005.*

Jung Je Son, et al; "MBS Clarification;" Retrieved from the Internet: URL: www.ieee802.org; Nov. 15, 2004.

Duke Dang; "The Enhancement to Macro Diversity in MBS Service;" Retrieved from the Internet: URL:www.ieee802.org/16/tge/contrib/C80216e-04_450.pdf; Nov. 4, 2004.

* cited by examiner

METHOD, SYSTEM AND APPARATUS FOR RECEIVING MULTICAST AND BROADCAST SERVICE

FIELD OF THE TECHNOLOGY

The present invention relates to technologies of wireless communications, and more particularly, to method, system and apparatus for receiving Multicast and Broadcast Service (MBS).

BACKGROUND OF THE INVENTION

The IEEE 802.16 specifies a fixed Broadband Wireless Access (BWA) standard for a wireless Metropolitan Area Network (MAN). The IEEE 802.16 standard defines different physical layer technologies for different frequency bands, and is mainly applied to residential, Small Office/Home Office (SOHO), remote operators, and Small-Medium Enterprise (SME) markets.

In current communication systems, multicast and broadcast are employed for transmitting data from one source to multiple destinations. In traditional mobile networks, a Cell Broadcast Service (CBS) allows transmission of low bit-rate data to all users through a common broadcast channel of a cell. The CBS service belongs to a message service.

In order to effectively utilize radio resources, the latest edition of the IEEE 802.16, i.e., IEEE 802.16e/D5, has introduced the MBS service which standardizes the Point to Multi-point transmission in the mobile network, thereby implementing network resources sharing and raising the utilizing rate of the network resources especially air interface. The newly-introduced MBS service may implement not only the multicast and broadcast of low bit-rate message services such as text, but also the multicast and broadcast of high bit-rate multimedia services, which is in the trend of development of future mobile data transmission.

A Mobile Service Station (MSS) receives the MBS service through an MBS_MAP message. Information Elements (IEs) of the MBS_MAP message are as shown in Table 1.

TABLE 1

| Syntax | | Size | Notes |
|---|---|---|---|
| MBS-MAP_Message_Format( ) { | | | |
| Management Message Type = | | 8 bits | |
| Frame number | | 24 bits | The frame number is identical to the frame number in the DL-MAP |
| for (i = 0; i < n; i++) { | | | |
| Multicast CID | | 12 bits | 12 LSB of CID for multicast |
| MBS DIUC | | 4 bits | |
| OFDMA Symbol offset | | 8 bits | OFDMA symbol offset with respect to start of the MBS zone |
| Subchannel offset | | 6 bits | |
| Boosting | | 3 bits | 000: normal (not boosted); +6 dB; 010: −6 dB; 011: +9 dB; 100: +3 dB; 101: −3 dB; 110: −9 dB; 111: −12 dB; |
| No. OFDMA Symbols | | 7 bits | |
| No. Subchannels | | 6 bits | |
| Repetition Coding Indication | | 2 bits | 0b00 -No repetition coding 0b01 -Repetition coding of 2 used 0b10 - Repetition coding of 4 used 0b11 -Repetition coding of 6 used |
| Next MBS frame offset | | 8 bits | The Next MBS frame offset value is lower 8 bits of the frame number in which the BS shall transmit the next MBS frame. |
| offset | Next MBS OFDMA Symbol | 8 bits | The offset of the OFDMA symbol in which the next MBS zone starts, measured in OFDMA symbols from the beginning of the downlink frame in which the MBS-MAP is transmitted. |
| } | | | |
| if !(byte boundary) { | | | |
| Padding Nibble | | 4 bits | Padding to reach byte boundary |
| } | | | |
| } | | | |

In an IEEE 802.16 system, a Media Access Control (MAC) layer is able to support tough user environments, cope with an application environment that each channel may have hundreds of users, and support continuous and burst traffics. The IEEE 802.16 system has an Asynchronous Transfer Mode (ATM) Convergence Sublayer (CS) and a packet CS, provides encapsulation of multiple data units from an upper layer into one MAC Protocol Data Unit (PDU) for transmission, thereby realizing transparent processes of ATM, IP and Ethernet services.

It can be seen from the above descriptions that, the IEEE 802.16 system may have wide applications.

It can be seen from Table 1 that, the MBS_MAP message provides physical channel resources allocated for a specific Multicast CID, i.e. an MBS service, in a given MBS ZONE. The physical channel resources include occupied OFDM symbols and used Subchannels. The MBS_MAP message also provides Downlink Interval Usage Code (DIUC) and Boosting for a given burst, and the Next MBS frame offset and the Next MBS OFDMA Symbol offset for determining the location of the next MBS frame.

Based on the above MBS_MAP message, when receiving the first MBS frame, the MSS needs to locate the MBS_MAP message according to an MBS_MAP Information Element (MBS_MAP_IE) in a DL_MAP message, and determines the physical channel resources occupied by the MBS_MAP message, the DIUC of the MBS_MAP message, and may also determine the start transmission point of the MBS Zone at the same time. And then the MSS determines the physical channel resources occupied by the first MBS frame and the DIUC of the first MBS frame according to MBS data resources and DIUC assigned by the MBS_MAP message, thereby receiving the first MBS frame in the MBS Zone. At the same time, the MSS may determine the location of the next MBS frame according to the Next MBS frame offset and the Next MBS OFDMA Symbol offset in the current MBS_MAP message. Thus, there is no need to receive the DL_MAP message to determine the location of the next MBS frame.

Although the location of the next MBS frame may be determined according to the current MBS_MAP message, the applicant finds out that the physical channel resources occupied by the next MBS frame and the DIUC of the next MBS frame further need to be determined to receive the next MBS frame. Therefore, it is necessary to acquire the MBS_MAP message associated with the next MBS frame before the arrival of the next MBS frame, so as to determine the physical channel resources occupied by the next MBS frame and the DIUC of the next MBS frame from the MBS-MAP message.

However in the MBS-MAP message defined by the current IEEE 802.16 standard, only the Next MBS frame offset and the Next MBS OFDMA Symbol offset are related with the next MBS frame. Although the location of the next MBS_MAP message may be determined according to the Next MBS OFDMA Symbol offset in the current MBS-MAP message, the physical channel resources occupied by the next MBS_MAP message and the DIUC of the next MBS_MAP message cannot be determined. Therefore, when the next MBS frame comes, the MSS cannot determine the physical channel resources occupied by the MBS_MAP message corresponding to the next MBS frame and the DIUC of the MBS_MAP message corresponding to the next MBS frame according to the current MBS_MAP message. Since the MSS cannot locate the next MBS_MAP message accurately, the physical channel resources occupied by the next MBS frame and the DIUC of the next MBS frame cannot be obtained from the MBS_MAP message.

To sum up, the applicant finds out that in the technical scheme taught by the current solution, the MSS cannot determine the physical channel resources occupied by the next MBS_MAP message and the DIUC of the next MBS_MAP message according to the current MBS_MAP message, therefore, the MSS cannot receive the MBS service directly.

SUMMARY OF THE INVENTION

Embodiments of the present invention provide method, system and apparatus for receiving Multicast and Broadcast Service (MBS).

According to an embodiment of the present invention, a method for receiving an MBS service includes:
adding information of a next MBS_MAP message in a current MBS_MAP message;
determining receiving information of the next MBS_MAP message according to the current MBS_MAP message and the information added in the current MBS_MAP message, receiving the next MBS_MAP message according to the receiving information determined, and then receiving the MBS service according to the next MBS_MAP message received.

According to another embodiment of the present invention, a method for receiving Multicast and Broadcast Service (MBS) includes:
configuring information of all MBS_MAP messages;
determining receiving information of a next MBS_MAP message according to the current MBS_MAP message and the information configured, receiving the next MBS_MAP message according to the receiving information determined, and receiving the MBS service according to the MBS_MAP message received.

According to another embodiment of the present invention, a method for receiving Multicast and Broadcast Service (MBS) includes:
configuring information of the MBS service;
determining receiving information of the MBS service according to the information configured, receiving the MBS service according to the receiving information determined.

According to another embodiment of the present invention, a Mobile Subscription Station (MSS) for receiving MBS is provided, being operable
for receiving a current MBS_MAP message added with information of a next MBS_MAP message;
for determining receiving information of the next MBS_MAP message according to the current MBS_MAP message and the information added in the current MBS_MAP message,
for receiving the next MBS_MAP message according to the receiving information determined, and
for receiving the MBS service according to the next MBS_MAP message received.

According to another embodiment of the present invention, a base station for use in MBS service is provided, being operable
for adding information of a next MBS_MAP message in a current MBS_MAP message; and
for sending the current MBS_MAP message added with the information of the next MBS_MAP message;
wherein the information of the next MBS_MAP message added in the current MBS_MAP message is for use of receiving the next MBS_MAP message.

According to another embodiment of the present invention, a system for receiving MBS service includes:
a base station, being operable for adding information of a next MBS_MAP message in a current MBS_MAP message; and
one or more MSSs, being operable for receiving the current MBS_MAP message added with information of the next MBS_MAP message from the base station;
for determining receiving information of the next MBS_MAP message according to the current MBS_MAP message and the information added in the current MBS_MAP message,
for receiving the next MBS_MAP message according to the receiving information determined, and
for receiving the MBS service according to the next MBS_MAP message received.

In embodiments of the present invention, information of the next MBS_MAP message is added. After receiving the first MBS_MAP message according to a DL_MAP message, the MSS can receive next MBS_MAP message according to the current MBS_MAP message instead of through the DL_MAP message. Thus, the MSS in an idle state needs not receive the DL_MAP message any more, and may directly receive the MBS service in the MBS ZONE, thereby saving power.

Embodiments of the present invention also provide a method for configuring information for all the MBS_MAP messages. The method requires no modification to the MBS_MAP message and is easy for implementation.

In addition, embodiments of the present invention also provide a method for configuring information for all MBS services, so that the MSS can receive the MBS service directly without depending on the MBS_MAP message.

EMBODIMENTS OF THE INVENTION

Figure 1:
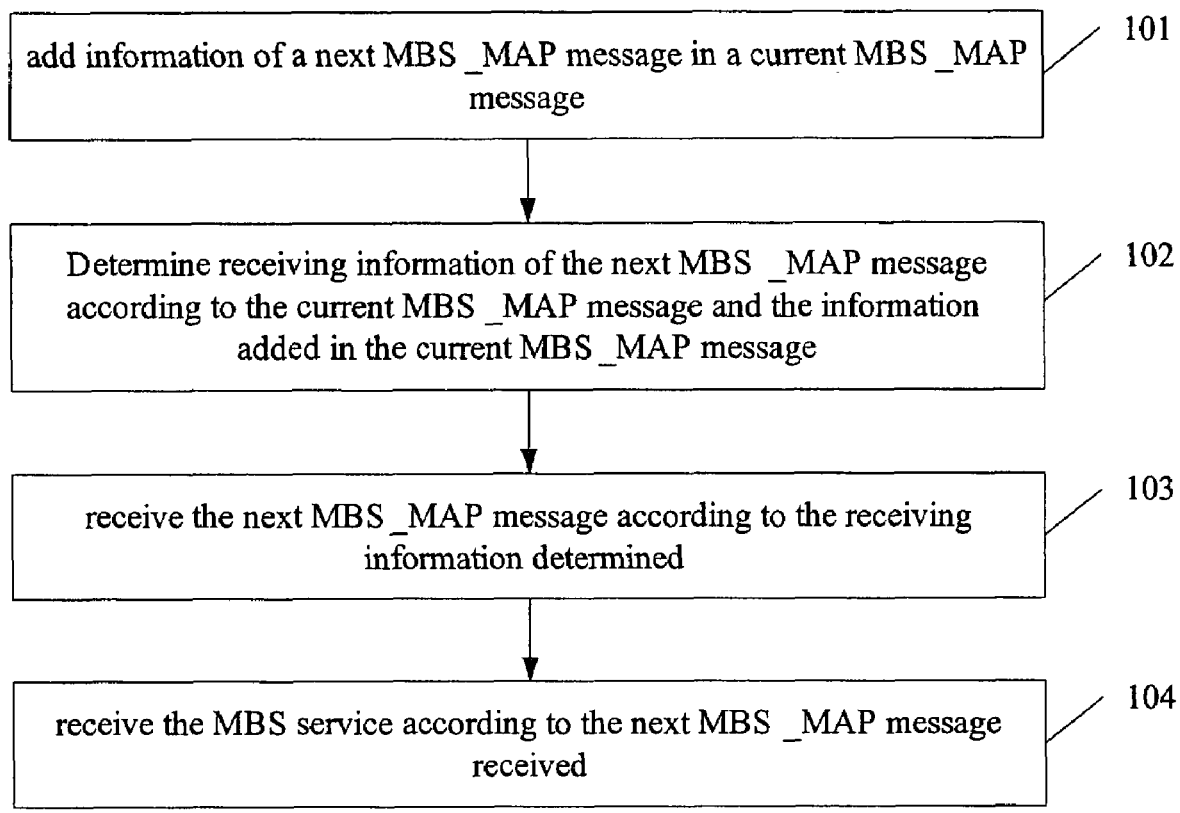
FIG. 1 is a simplified schematic diagram illustrating a method of receiving the MBS service according to an embodiment of the present invention.

The present invention is hereinafter described in detail with reference to accompanying embodiments.

In an embodiment of the present invention, as shown in FIG. 1, the method for receiving the MBS service includes:

101, add information of a next MBS_MAP message in a cunent MBS_MAP message;

102, determine receiving information of the next MBS_MAP message according to the current MBS_MAP message and the information added in the current MBS_MAP message;

103, receive the next MBS_MAP message according to the receiving information determined;

104, receive the MBS service according to the next MBS_MAP message received.

Specifically, the information added to the MBS_MAP message may be the physical channel resources of the next MBS_MAP message, or the DIUC of the next MBS_MAP message, or both the physical channel resources and the DIUC of the next MBS_MAP message.

The physical channel resources of the next MBS_MAP message added in the current MBS_MAP message enable base stations provide MBS services at different times to use different physical channel resources. The DIUC of the next MBS_MAP message added in the current the MBS_MAP message enables the base stations to use different DIUCs. The simultaneous adding of the physical channel resources and the DIUC enable the base stations to use different physical channel resources and different DIUCs.

The above three manners will be respectively described hereinafter.

As to the manner of only adding the physical channel resources in the MBS_MAP message, in order to receive the next MBS_MAP message according to the current MBS_MAP message, the DIUC of all the MBS_MAP messages are required to be configured. For example, all the MBS_MAP messages may be configured to use the same DIUC. Thus, after determining the physical channels resources of the next MBS_MAP message according to the current MBS_MAP message, the MSS may take the DIUC of the first MBS_MAP message it receives as the DIUC of the next MBS_MAP message, thereby implementing the receiving of the next MBS_MAP message.

As to the manner of only adding the DIUC in the MBS_MAP message, the implementation is similar to the manner of only adding the physical channel resources. The difference only resides in that, the physical channel resources of all the MBS_MAP messages should be configured. For example, all the MBS_MAP messages may be configured to use the same physical channel resources. Thus, after determining the DIUC of the next MBS_MAP message according to the current MBS_MAP message, the MSS may take the physical channel resources used by the first MBS_MAP message as the physical channel resources for the next MBS_MAP message, thereby implementing the receiving of the next MBS_MAP message.

As to the manner of adding both the physical channel resources and the DIUC, the MSS may determine the physical channel resources and the DIUC of the next MBS_MAP message directly according to the information added in the current MBS_MAP message. Therefore, the MSS may directly receive the next MBS_MAP message according to the information determined.

The foregoing is a detailed description of the three manners. The information of physical channel resources added to the MBS_MAP message may include: Next MBS_MAP Subchannel offset, Next MBS_MAP No. OFDMA Symbols, and Next MBS_MAP No. Subchannels. Through the foregoing IEs together with the Next MBS OFDMA Symbol offset already contained in the MBS_MAP message, the physical channel resources occupied by the next MBS_MAP message can be definitely determined. The DIUC added to the MBS_MAP message may be a Next MBS_MAP DIUC IE. The MSS may determine the DIUC of the next MBS_MAP message according to the Next MBS_MAP DIUC contained in the MBS_MAP message.

Additionally, in the above three manners, Boosting of the next MBS_MAP message and IEs for reliable receiving of the next MBS_MAP message may also be added to the MBS_MAP message. For example, a Next MBS_MAP Boosting IE may be added in respect of the boosting of the next MBS_MAP message, and a Next MBS_MAP Repetition Coding Indication IE in respect of the reliable receiving of the next MBS_MAP message. Thus, the MSS may determine the Boosting and Repetition Coding Indication of the next MBS_MAP message according to the current MBS_MAP message, thereby receiving the next MBS_MAP message better.

The structure of the MBS_MAP message with the added IEs including physical channel resources, DIUC, Boosting and Repetition Coding Indication is as shown in Table 2.

TABLE 2

| Syntax | Size | Notes |
|---|---|---|
| MBS-MAP_Message_Format( ) { | | |
| Management Message Type = ? | 8 bits | |
| Frame number | 24 bits | The frame number is identical to the frame number in the DL-MAP |
| for (i = 0; i < n; i++) { | | |
| Multicast CID | 12 bits | 12 LSB of CID for multicast |
| DIUC | 4 bits | |
| OFDMA Symbol offset | 8 bits | OFDMA symbol offset with respect to start of the MBS zone |
| Subchannel offset | 6 bits | |

TABLE 2-continued

| Syntax | Size | Notes |
|---|---|---|
| Boosting | 3 bits | 000: normal (not boosted); 001: +6 dB; 010: −6 dB; 011: +9 dB; 100: +3 dB; 101: −3 dB; 110: −9 dB; 111: −12 dB; |
| No. OFDMA Symbols | 7 bits | |
| No. Subchannels | 6 bits | |
| Repetition Coding Indication | 2 bits | 0b00 - No repetition coding<br>0b01 - Repetition coding of 2 used<br>0b10 - Repetition coding of 4 used<br>0b11 - Repetition coding of 6 used |
| } | | |
| Next MBS frame offset | 8 bits | The Next MBS frame offset value is lower 8 bits of the frame number in which the BS shall transmit the next MBS frame. |
| Next MBS_MAP DIUC | 4 bits | |
| Next MBS OFDMA Symbol offset | 8 bits | The offset of the OFDMA symbol in which the next MBS zone starts, measured in OFDMA symbols from the beginning of the downlink frame in which the MBS-MAP is transmitted. |
| Next MBS_MAP Subchannel offset | 6 bits | |
| Next MBS_MAP Boosting | 3 bits | 000: normal (not boosted); 001: +6 dB; 010: −6 dB; 011: +9 dB; 100: +3 dB; 101: −3 dB; 110: −9 dB; 111: −12 dB; |
| Next MBS_MAP No.OFDMA Symbols | 7 bits | |
| Next MBS_MAP No.Subchannel | 6 bits | |
| Next MBS_MAP Repetition Coding Indication | 2 bits | 0b00 - No repetition coding<br>0b01 - Repetition coding of 2 used<br>0b10 - Repetition coding of 4 used<br>0b11 - Repetition coding of 6 used |
| If !(byte boundary) { | | |
| Padding Nibble | 4 bits | Padding to reach byte boundary. |
| } | | |
| } | | |

The above solution is to add IEs for receiving the next MBS_MAP message in the current MBS_MAP message. Alternatively, the MBS_MAP message may also not be modified. At this time, all the MBS_MAP messages may be pre-configured to use the same physical channel resources and the same DIUC. Thus, the MSS may determine the physical channel resources and the DIUC of the next MBS_MAP message according to the configuration, and then determines the location of the next MBS_MAP message according to the current MBS_MAP message, receives the next MBS_MAP message according to the location, physical channel resources and DIUC determined, and receives the next MBS frame according to the next MBS_MAP message.

The process of the MSS receiving the MBS_MAP message according to the physical channel resources and the DIUC may include: the MSS determines the physical channel resources and the DIUC of the MBS_MAP message when subscribing to the MBS service, and then receives the MBS_MAP message.

Alternatively, the process of the MSS receiving the MBS_MAP message according to the physical channel resources and the DIUC may also include: the MSS determines the physical channel resources and the DIUC of the all MBS_MAP messages according to the physical channel resources and the DIUC of the MBS_MAP message carried in the DL_MAP message, and then receives the MBS_MAP message. The MSS needs to receive the first MBS_MAP message by receiving the DL_MAP message.

Additionally, the physical channel resources and the DIUC can be configured for the MBS service when the MSS subscribes to the MBS service. Accordingly, when receiving the MBS service, the MSS can determine the physical channel resources and the DIUC of the MBS service according to the configuration, and then receive the MBS service according to the physical channel resources and DIUC determined.

The physical channel resources and the DIUC of the MBS service may also be configured in the DL_MAP message. Specifically, in the MBS_MAP_IE of the DL_MAP message. Therefore, the MSS can determine the physical channel resources and the DIUC of the MBS service according to the DL_MAP message. Thus, the MSS may receive the MBS service according to the DL_MAP message directly without receiving the MBS_MAP message.

The foregoing description is only the preferred embodiments of the present invention and is not for use in limiting the protection scope thereof. All the modifications, equivalent replacements or improvements in the scope of the spirit and principles of the present invention should be included in the protection scope of the present invention.

What is claimed is:

1. A method for receiving a Multicast and Broadcast Service (MBS), comprising:

receiving, by a Mobile Service Station (MSS), a current Multicast and Broadcast Service MAPPING (MBS_MAP) message carrying receiving information of a next MBS_MAP message;

detecting, by the MSS, the receiving information of the next MBS_MAP message in the current MBS_MAP message, wherein the receiving information comprises next MBS_MAP Number Orthogonal Frequency Division Multiple Access (OFDMA) Symbols and next MBS_MAP Number Subchannels;

receiving, by the MSS, the next MBS_MAP message according to the receiving information; and receiving, by the MSS, MBS service according to the next MBS_MAP message received.

2. The method of claim 1, further comprising:

detecting, by the MSS, receiving information of a first MBS_MAP message in a DownLink_MAPPING (DL_MAP) message.

3. The method of claim 1, wherein the receiving information comprises a location, physical channel resources and Downlink Interval Usage Code (DIUC), of the next MBS_MAP message.

4. The method of claim 1, wherein the receiving information in the current MBS_MAP message comprises physical channel resources occupied by the next MBS_MAP message.

5. The method of claim 4, wherein the physical channel resources occupied by the next MBS_MAP message comprise: next MBS_MAP Subchannel offset.

6. The method of claim 4, further comprising:

configuring, by the MSS, all the MBS_MAP messages to use a same Downlink Interval Usage Code (DIUC);

wherein the detecting, by the MSS, the receiving information of the next MBS_MAP message in the current MBS_MAP message comprises:

determining, by the MSS, the physical channel resources occupied by the next MBS_MAP message according to the receiving information carried in the current MBS_MAP message;

determining, by the MSS, that the DIUC is used by the next MBS_MAP message according to the configuration; and determining, by the MSS, a location of the next MBS_MAP message according to the current MBS_MAP message.

7. The method of claim 1, wherein the receiving information in the current MBS_MAP message comprises a Downlink Interval Usage Code (DIUC) of the next MBS_MAP message.

8. The method of claim 7, further comprising:

configuring, by the MSS, all the MBS_MAP messages to use same physical channel resources;

wherein the detecting, by the MSS, the receiving information of the next MBS_MAP message the current MBS_MAP message comprises:

determining, by the MSS, that the physical channel resources are used by the next MBS_MAP message according to the configuration;

determining, by the MSS, the DIUC of the next MBS_MAP message according to the receiving information in the current MBS_MAP message; and determining, by the MSS, a location of the next MBS_MAP message according to the current MBS_MAP message.

9. The method of claim 1, wherein the receiving information in the current MBS_MAP message comprises physical channel resources occupied by the next MBS_MAP message and a Downlink Interval Usage Code (DIUC)-of the next MBS_MAP message.

10. The method of claim 9, wherein the detecting, by the MSS, the receiving information of the next MBS_MAP message in the current MBS_MAP message comprises:

determining, by the MSS, the physical channel resources occupied by the next MBS_MAP message and the DIUC of the next MBS_MAP message according to the receiving information in the current MBS_MAP message; and determining, by the MSS, a location of the next MBS_MAP message according to the current MBS_MAP message.

11. The method of claim 1, before receiving, by the MSS, the next MBS_MAP message according to the receiving information, further comprising:

detecting, by the MSS, Boosting of the next MBS_MAP message in the current MBS_MAP message; and receiving, by the MSS, the next MBS_MAP message according to the Boosting and the receiving information determined.

12. The method of claim 1, before receiving, by the MSS, the next MBS_MAP message according to the receiving information, further comprising:

detecting, by the MSS, Repetition Coding Indication information of the next MBS_MAP message in the current MBS_MAP message; and receiving, by the MSS, the next MBS_MAP message according to the Repetition Coding Indication information and the receiving information determined.

13. A method for receiving Multicast and Broadcast Service (MBS), comprising:

configuring, by a Mobile Service Station (MSS), receiving information of all MBS_MAP messages;

receiving, by the MSS, a current MBS_MAP message carrying receiving information of a next MBS_MAP message;

detecting, by the MSS, the receiving information of the next MBS_MAP message in the current MBS_MAP message according to the configuration, wherein the receiving information of the next MBS_MAP message comprises next MBS_MAP Number Orthogonal Frequency Division Multiple Access (OFDMA) Symbols and next MBS_MAP Number Subchannels;

receiving, by the MSS, the next MBS_MAP message according to the receiving information of the next MBS_MAP message; and receiving, by the MSS, the MBS service according to the next MBS_MAP message received.

14. The method of claim 13, wherein the configured receiving information comprises physical channel resources and Downlink Interval Usage Code (DIUC); and the current MBS_MAP message comprises location information of the next MBS_MAP message;

the detecting, by the MSS, the receiving information of the next MBS_MAP message in the current MBS_MAP message according to the configuration comprises:

determining, by the MSS, the physical channel resources and the DIUC of the next MBS_MAP message according to the physical channel resources and the DIUC configured; and determining, by the MSS, a location of the next MBS_MAP message according to the location information of the next MBS_MAP message contained in the current MBS_MAP message.

15. A method for receiving Multicast and Broadcast Service (MBS), comprising:

configuring, by a Mobile Service Station (MSS), receiving information of MBS service;

detecting, by the MSS, the receiving information of the MBS service according to the configuration, wherein the receiving information comprises next MBS_MAP Number Orthogonal Frequency Division Multiple Access (OFDMA) Symbols and next MBS_MAP Number Subchannels; and receiving, by the MSS, the MBS service according to the receiving information.

16. The method of claim 15, wherein the receiving information of the MBS service is configured in a DL_MAP message; and the detecting, by the MSS, the receiving information of the MBS service according to the configuration comprises:
detecting, by the MSS, the receiving information of the MBS service according to the DL_MAP message received.

17. The method of claim 15, wherein the receiving information of the MBS service configured comprises physical channel resources and Downlink Interval Usage Code (DIUC).

18. A Mobile Subscriber Station (MSS), for receiving a Multicast and Broadcast Service (MBS), configured to
receive a current MBS_MAP message carrying receiving information of a next MBS_MAP message;
detect the receiving information of the next MBS_MAP message in the current MBS_MAP message, wherein the receiving information comprises next MBS_MAP Number Orthogonal Frequency Division Multiple Access (OFDMA) Symbols and next MBS_MAP Number Subchannels;
receive the next MBS_MAP message according to the receiving information; and
receive the MBS service according to the next MBS_MAP message received.

19. The MSS of claim 18, wherein the receiving information in the current MBS_MAP message comprises physical channel resources occupied by the next MBS_MAP message, and all the MBS_MAP messages are configured to use a same Downlink Interval Usage Code (DIUC);
the apparatus is further configured to
determine the physical channel resources occupied by the next MBS_MAP message according to the receiving information in the current MBS_MAP message;
determine that the DIUC is used by the next MBS_MAP message.

20. The MSS of claim 18, wherein the receiving information carried in the current MBS_MAP message comprises DIUC of the next MBS_MAP message, and all the MBS_MAP messages are configured to use a same physical channel resources;
the apparatus is further configured to
determine that the physical channel resources is used by the next MBS_MAP message; and
determine the DIUC of the next MBS_MAP message according to the receiving information in the current MBS_MAP message.

21. The MSS of claim 18, wherein the receiving information in the current MBS_MAP message is physical channel resources occupied by the next MBS_MAP message and DIUC of the next MBS_MAP message;

the apparatus is further configured to
determine the physical channel resources occupied by the next MBS_MAP message and the DIUC of the next MBS_MAP message according to the receiving information in the current MBS_MAP message.

22. A base station for use in a Multicast and Broadcast Service (MBS), configured to
add receiving information of a next MBS_MAP message in a current MBS_MAP message; and
send the current MBS_MAP message including the receiving information of the next MBS_MAP message;
wherein the receiving information of the next MBS_MAP message in the current MBS_MAP message is for use of receiving the next MBS_MAP message, and the receiving information comprises next MBS_MAP Number Orthogonal Frequency Division Multiple Access (OFDMA) Symbols and next MBS_MAP Number Subchannels.

23. The base station of claim 22, wherein the receiving information in the current MBS_MAP message includes physical channel resources occupied by the next MBS_MAP message; and
the apparatus is further configured to
configure all the MBS_MAP messages to use a same Downlink Interval Usage Code (DIUC).

24. The base station of claim 22, wherein the receiving information added in the current MBS_MAP message is a DIUC of the next MBS_MAP message; and
the apparatus is further configured to
configure all the MBS_MAP messages to use a same physical channel resource.

25. The base station of claim 22, wherein the receiving information added in the current MBS_MAP message is physical channel resources occupied by the next MBS_MAP message and DIUC of the next MBS_MAP message.

26. A system for receiving Multicast and Broadcast Service, MBS, comprising:
a base station, configured to
add receiving information of a next MBS_MAP message in a current MBS_MAP message; and
one or more Mobile Subscriber Stations (MSSs), configured to
receive the current MBS_MAP message including the receiving information of the next MBS_MAP message from the base station;
detect the receiving information of the next MBS_MAP message in the current MBS_MAP message, wherein the receiving information comprises next MBS_MAP Number Orthogonal Frequency Division Multiple Access (OFDMA) Symbols and next MBS_MAP Number Subchannels,
receive the next MBS_MAP message according to the receiving information, and
receive the MBS service according to the next MBS_MAP message received.

* * * * *